US006849141B2

(12) United States Patent
Buchler et al.

(10) Patent No.: US 6,849,141 B2
(45) Date of Patent: Feb. 1, 2005

(54) CASKET LID AND METHOD OF MAKING SAME

(75) Inventors: Kevin R. Buchler, Cincinnati, OH (US); Gary R. Cunningham, Greensburg, IN (US); Todd K. Dennis, Batesville, IN (US); Bryan M. Hankel, Batesville, IN (US); John E. Linville, Lawrenceburg, IN (US); Donald R. Maier, Batesville, IN (US); Stephanie E. Mauch, Cincinnati, OH (US); Vincent Mark Moster, Sunman, IN (US); Roger L. R uss, Brookville, IN (US); Patrick M. Saaf, Batesville, IN (US)

(73) Assignee: Batesville Services, Inc., Batesville, IN (US)

( * ) Notice: Subject to any disclaimer, the term of this patent is extended or adjusted under 35 U.S.C. 154(b) by 0 days.

(21) Appl. No.: 10/261,406

(22) Filed: Oct. 1, 2002

(65) Prior Publication Data

US 2003/0122280 A1 Jul. 3, 2003

Related U.S. Application Data

(63) Continuation of application No. 10/093,288, filed on Mar. 7, 2002, which is a continuation-in-part of application No. 09/457,163, filed on Dec. 8, 1999, now Pat. No. 6,503,429, which is a continuation-in-part of application No. 09/153, 626, filed on Sep. 15, 1998, now Pat. No. 6,243,931.

(51) Int. Cl.[7] .......................... A61G 17/00; B29C 43/18

(52) U.S. Cl. ...................... 156/62.2; 264/109; 264/112; 27/14; 27/16

(58) Field of Search ................................ 264/112, 109; 27/14, 16; 156/62.2

(56) References Cited

U.S. PATENT DOCUMENTS

| | | | |
|---|---|---|---|
| 925,929 | A | 6/1909 | Magoris |
| 1,234,180 | A | 7/1917 | Kersten |
| 1,507,957 | A | 9/1924 | Edwards |
| 1,578,652 | A | 3/1926 | Fisher |
| 1,730,666 | A | 10/1929 | Listing |
| 1,903,197 | A | 3/1933 | Scott |
| 2,338,035 | A | 12/1943 | Gerold |
| 2,494,473 | A | 1/1950 | Dowling |
| 2,664,615 | A | 1/1954 | Hillenbrand et al. |
| 3,146,285 | A | 8/1964 | Munk |
| 3,164,880 | A | 1/1965 | Hotchkiss |
| 3,166,617 | A | 1/1965 | Munk |
| 3,220,080 | A | 11/1965 | Connelly |
| 3,261,897 | A | 7/1966 | Munk |
| 3,283,052 | A | 11/1966 | Munk |
| 3,354,248 | A | 11/1967 | Haas et al. |
| 3,406,229 | A | 10/1968 | Cenegy |
| 3,423,267 | A | 1/1969 | Munk |
| 3,490,114 | A | 1/1970 | Connelly et al. |

(List continued on next page.)

FOREIGN PATENT DOCUMENTS

| | | | |
|---|---|---|---|
| EP | 0 466 653 | A1 | 1/1992 |
| GB | 2 114 498 | A | 8/1983 |
| NL | 6 516 139 | A | 6/1967 |

*Primary Examiner*—Mary Lynn Theisen
(74) *Attorney, Agent, or Firm*—Wood, Herron & Evans, L.L.P.

(57) ABSTRACT

A method of making a lid for a casket comprises providing tooling configured to produce a one-piece, unitary casket lid having a crown, a pie, a rim and a header, providing settable material from which to mold the lid, molding the settable material with the tooling, permitting the settable material to set thereby producing a one-piece, unitary casket lid having a crown, a pie, a rim and a header, and adhesively applying a wood veneer sheet to at least a portion of the lid. The veneer sheet can be applied with either a membrane press or a profile wrapping machine.

70 Claims, 10 Drawing Sheets

U.S. PATENT DOCUMENTS

| | | | | |
|---|---|---|---|---|
| 3,574,906 | A | | 4/1971 | Rittenhouse |
| 3,590,428 | A | | 7/1971 | Munk et al. |
| 3,663,137 | A | | 5/1972 | Haas et al. |
| 3,697,208 | A | | 10/1972 | Munk et al. |
| 3,720,738 | A | | 3/1973 | Munk |
| 3,726,954 | A | | 4/1973 | Munk et al. |
| 3,729,786 | A | | 5/1973 | Walding |
| 3,762,974 | A | | 10/1973 | Wirz |
| 3,764,645 | A | | 10/1973 | Munk |
| 3,781,948 | A | | 1/1974 | Pitt |
| 3,809,736 | A | | 5/1974 | Munk |
| 3,954,376 | A | | 5/1976 | Munk |
| 3,969,798 | A | | 7/1976 | Sahlin |
| 3,975,127 | A | | 8/1976 | Munk et al. |
| 3,997,643 | A | | 12/1976 | Munk et al. |
| 4,029,023 | A | | 6/1977 | Rosewicz et al. |
| 4,034,447 | A | | 7/1977 | Kollmann et al. |
| 4,041,582 | A | | 8/1977 | MacDonald |
| 4,065,898 | A | | 1/1978 | Munk |
| 4,104,348 | A | | 8/1978 | Munk et al. |
| 4,115,490 | A | | 9/1978 | Munk |
| 4,123,831 | A | | 11/1978 | Covington |
| 4,151,630 | A | | 5/1979 | Havey |
| 4,153,490 | A | | 5/1979 | Werz et al. |
| 4,156,956 | A | | 6/1979 | Partridge et al. |
| 4,167,232 | A | | 9/1979 | Munk et al. |
| 4,176,431 | A | | 12/1979 | Havey, III |
| 4,209,880 | A | | 7/1980 | Lidholm |
| 4,214,861 | A | | 7/1980 | Munk et al. |
| 4,225,545 | A | | 9/1980 | Munk et al. |
| 4,318,351 | A | | 3/1982 | Munk |
| 4,399,596 | A | | 8/1983 | Parlour et al. |
| 4,497,662 | A | | 2/1985 | Chisholm et al. |
| 4,504,347 | A | | 3/1985 | Munk et al. |
| 4,544,342 | A | | 10/1985 | Werz et al. |
| 4,544,344 | A | | 10/1985 | Munk |
| 4,550,832 | A | | 11/1985 | Traumuller et al. |
| 4,550,847 | A | | 11/1985 | Traumuller et al. |
| 4,552,797 | A | | 11/1985 | Munk et al. |
| 4,610,900 | A | | 9/1986 | Nishibori |
| 4,622,190 | A | | 11/1986 | Schultz |
| 4,629,594 | A | | 12/1986 | Munk |
| 4,730,370 | A | | 3/1988 | Elder |
| 4,773,134 | A | | 9/1988 | Kay |
| 4,775,312 | A | | 10/1988 | Werz et al. |
| 4,867,670 | A | | 9/1989 | Munk |
| 4,967,455 | A | | 11/1990 | Elder |
| 4,977,930 | A | | 12/1990 | Munk et al. |
| 4,990,040 | A | | 2/1991 | Nulle et al. |
| 5,001,068 | A | | 3/1991 | Golombek |
| 5,016,416 | A | | 5/1991 | Munk |
| 5,045,262 | A | | 9/1991 | Munk |
| 5,078,938 | A | | 1/1992 | Munk et al. |
| 5,155,147 | A | | 10/1992 | Dietz et al. |
| 5,213,821 | A | | 5/1993 | Munk |
| 5,284,546 | A | | 2/1994 | Tilby |
| 5,485,661 | A | | 1/1996 | McClure |
| 5,974,640 | A | * | 11/1999 | Vosahlik et al. ................. 27/2 |
| 6,503,429 | B1 | * | 1/2003 | Linville et al. ............. 264/112 |

* cited by examiner

CASKET LID AND METHOD OF MAKING SAME

RELATED APPLICATIONS

This application is a continuation of application Ser. No. 10/093,288, filed Mar. 7, 2002 which is a continuation-in-part of application Ser. No. 09/457,163, filed Dec. 8, 1999, now U.S. Pat. No. 6,503,429 a continuation-in-part of application Ser. No. 09/153,626, filed Sep. 15, 1998 now U.S. Pat. No. 6,243,931, the entire disclosures of which are hereby incorporated by reference herein as if fully set forth in their entirety.

FIELD OF THE INVENTION

This invention relates generally to caskets, and more particularly to a method of making one-piece, unitary lids for caskets by a novel molding process.

BACKGROUND OF THE INVENTION

A casket includes a shell and, in the case of so-called "split top" caskets, a pair of lids or caps, a head end cap and a foot end cap. Caskets have most often been fabricated of either metal or wood for aesthetic reasons. More recently, some lower end caskets have been fabricated out of materials such as plastic, hardboard, and cardboard. While such materials are much less expensive than sheet metal and fine furniture grade wood, there is a consequent decrease in the aesthetics of the casket. Thus, efforts continue to be made by those in the industry to devise more economically produced, less expensive caskets which do not exhibit a consequent decrease in aesthetics and ornamentality.

Each cap in a so-called split top casket is comprised of a crown, a pie, a rim, a header and, in the case of convex shaped lids, a web. More particularly, the crown is, as its name implies, the crown portion of the lid, which is often, though not necessarily, convex in shape. As its name implies, the pie is a pie-shaped section which fits into a pie-shaped cutout in one end of the crown. The crown and pie assembly is typically referred to in the industry as the "cover". The cover thus has opposed sides and opposed ends. Each of the opposed sides has a decorative piece of molding known as a side rim member secured thereto. Similarly, the pie has secured thereto a decorative piece of molding known as an end rim member. The pair of side rim members and the end rim member together comprise the rim. At the end of the cover opposite from the pie, there is attached to the crown a web panel, and there is attached to the ends of the side rim members and to the lower edge of the web a header panel. In the case of flat top casket lids, there is no web, but simply a header. The term "header", as used herein, shall be deemed to encompass both a) a header panel only, and b) a header panel in combination with a web panel. The combined assembly, i.e., crown, pie, rim and header, comprises the casket cap or casket lid.

In order to fabricate a cap, several different pieces must be time-consumingly assembled and secured together. For example, in the case of sheet metal caskets, a number of sheet metal stampings must be fixtured and then welded together to form the cap. In the case of wood caskets, the crown is formed from a plurality of boards secured together lengthwise with glue and fasteners. The pie is likewise formed from a plurality of boards and is secured to the crown with glue and fasteners. Next, the side and end rim members, themselves formed from a plurality of boards, are secured to the cover and the header is secured to the cover and the side rim members, again via glue and fasteners. As can be appreciated, utilizing a combination of glue and fasteners to secure together the various components of a wood casket cap is tedious and time consuming.

It would be desirable to reduce the number of component parts necessary to fabricate a cap thereby reducing assembly time and costs, etc. One attempt at accomplishing this, commercialized by Werzalit AG & Co., Federal Republic of Germany, involved the use of a mixture of wood chips and binder which was molded with tooling into a one-piece cover, i.e. crown and pie assembly. This molded one-piece cover thus eliminated the separate crown and pie and the steps required to secure the two together. The tooling for forming such a one-piece cover comprised a male portion configured into the shape of the under side of the cover to be formed, and a female portion configured into the shape of the upper side of the cover to be formed. However, once this single-piece cover was formed, a manufacturer was still required to fabricate and install separate side rim members, end rim member and header to the one-piece cover in order to complete the cap assembly.

Another less than completely successful attempt at fabricating a one-piece casket cap utilized fiberglass and resin applied to a form in the shape of a casket cap, the process otherwise being known as "laying up." While such a one-piece, integral fiberglass casket cap did include a crown, a pie, side rim members, end rim members and a header, the fiberglass material itself as well as its use created difficulties. For example, the process of laying up of fiberglass is time and labor intensive and does not readily lend itself to automation. Further, the glass fibers are difficult to manage and the resin produces noxious odors.

It would be desirable to eliminate even more of the separate component parts of a casket cap in order to eliminate the costs associated with producing the component parts as well as the costs associated with assembling together all of the component parts, while at the same time avoiding the difficulties associated with fiberglass construction techniques.

SUMMARY OF THE INVENTION

The present invention is a method of making a one-piece, unitary lid for a casket and a casket lid made by the method. The method and lid of this invention completely eliminate the separate component parts required to be assembled together in prior casket lids. The method of the invention comprises providing tooling configured to produce a one-piece, unitary casket lid having a crown, a pie, a rim and a header, providing settable material from which to mold the lid, molding the settable material with the tooling and permitting the settable material to set thereby producing the one-piece, unitary casket lid having a crown, a pie, a rim and a header. A wood veneer sheet is adhesively applied to at least a portion of the lid.

The veneer sheet can be applied to the lid with either a membrane press or a profile wrapping machine. Preferably, glue is applied to the veneer sheet and the veneer sheet is adhered to the lid with the use of heat and pressure. The veneer sheet is preferably applied to the exterior surfaces of the crown, pie, rim and header.

In another aspect, a method for making a lid for a casket comprises providing tooling configured to produce a one-piece, unitary casket lid portion having a crown and a pie, providing settable material from which to mold the lid portion, molding the settable material with the tooling, permitting the settable material to set thereby producing a one-piece, unitary casket lid portion having a crown and a pie and adhesively applying wood veneer to the crown and the pie. A rim can be fabricated of solid wood and attached to the crown and pie, or a rim can be fabricated from a solid non-wood substrate profile wrapped with wood veneer, and attached to the crown and pie.

In another aspect, a method of making a lid for a casket comprises providing tooling configured to produce a one-piece, unitary casket lid portion having a crown and a pair of side rims, providing settable material from which to mold the lid portion molding the settable material with the tooling, permitting the settable material to set thereby producing a one-piece, unitary casket lid portion having a crown and a pair of side rims and adhesively applying wood veneer to the crown and side rims. A pie and end rim can be fabricated of solid wood and attached to the crown and side rims.

In another aspect, a method of making a lid for a casket comprises providing tooling configured to produce a one-piece unitary casket lid having a crown, a pie, a pair of side rims, an end rim and a header, providing settable material from which to mold the lid, molding the settable material with the tooling, permitting the settable material to set thereby producing a one-piece, unitary casket lid having a crown, a pie, a pair of side rims, an end rim and a header, separating a pie and end rim from the crown and the side rims, adhesively applying a first wood veneer sheet to the pie and end rim, adhesively applying a second wood veneer sheet to the crown and side rims and attaching the veneered pie and end rim to the veneered crown and side rims.

In another aspect, for a casket lid having a pie and a crown, a method of forming a miter joint from first and second sheets of veneer applied to the pie and crown, along the line of intersection of the pie and crown, comprises applying a first strip of masking tape to the line of intersection, trimming the first strip of masking tape along the line of intersection and removing the trimmed portion from the pie side of the line of intersection, applying a first sheet of veneer to the pie, the sheet overlying the portion of the first strip of masking tape remaining on the crown side of the line of intersection, applying a second strip of masking tape to the first sheet of veneer over the line of intersection, trimming the second strip of masking tape and the first sheet of veneer along the line of intersection and removing the trimmed portions from the crown side of the line of intersection by removing the portion of the first strip of masking tape remaining on the crown side of the line of intersection, applying a second sheet of veneer on the crown, the sheet overlying the portion of the second strip of masking tape remaining on the pie side of the line of intersection and trimming the second sheet of veneer along the line of intersection and removing the trimmed portion from the pie side of the line of intersection by removing the portion of the second strip of masking tape remaining on the pie side of the line of intersection.

In another aspect, a method of making a head end lid and a foot end lid for a casket comprises providing tooling configured to produce a one-piece, unitary casket lid having a crown, a pie, a rim and a header, providing settable material from which to mold the lid, molding the settable material with the tooling, permitting the settable material to set thereby producing a first one-piece, unitary casket lid having a crown, a pie, a rim and a header, repeating the above steps to produce a second such casket lid, positioning the first and second lids header-end-to-header end, adhesively applying a single wood veneer sheet to the crowns of both the first and second lids and separating the first lid from the second lid. The veneer sheet can applied to the lids with a membrane press.

The invention thus provides a method of producing a molded one-piece, unitary lid for a casket which includes a crown, a pie, a rim and a header. Multiple components are not required to be fabricated or assembled. The invention also provides methods of applying decorative veneer to the molded one-piece, unitary lid.

These and other advantages of the present invention will become more readily apparent during the following detailed description taken in conjunction with the drawings herein, in which:

DETAILED DESCRIPTION OF THE INVENTION

Figure 1:
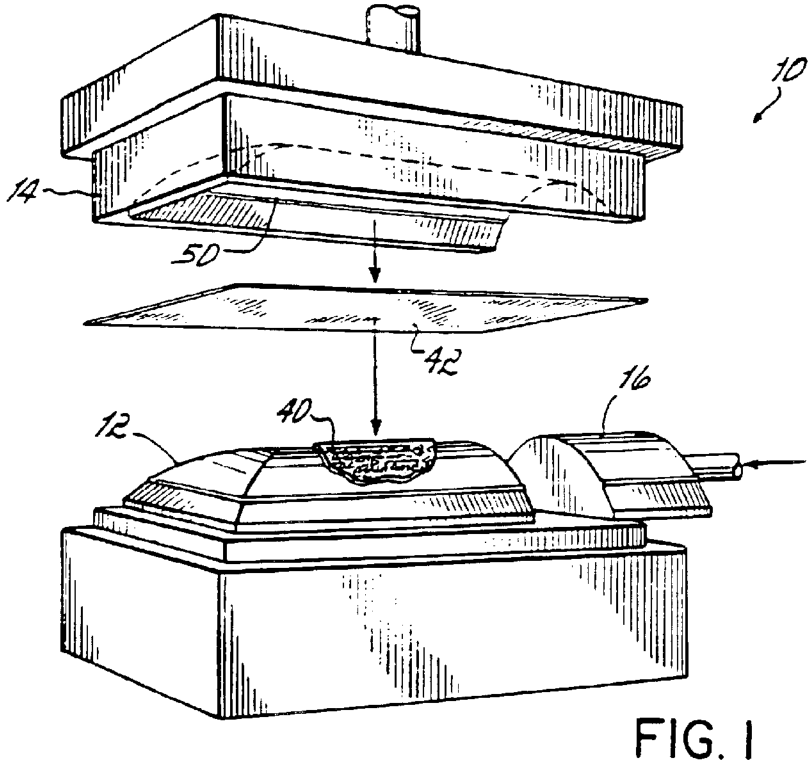
FIG. 1 is a perspective view of the tooling for carrying out the method of the invention, with the tooling illustrated in the open position prior to compressing the resin impregnated tissue paper onto the settable material between male and female portions of the tooling.

Referring first to FIG. 1, there is illustrated tooling 10 which is adapted to make a one-piece, unitary lid for a casket. The tooling 10 comprises a male portion 12 and female portions 14 and 16, the portion 16 essentially being a side ram or press. The tooling 10 is configured to produce a one-piece, unitary casket lid having a crown, a pie, a rim and a header. In particular, the male portion 12 of the tooling 10 is configured to produce the underneath surface of the lid, whereas the female portions of the tooling 14, 16 are configured to produce the exterior surface of the lid.

Figure 4:
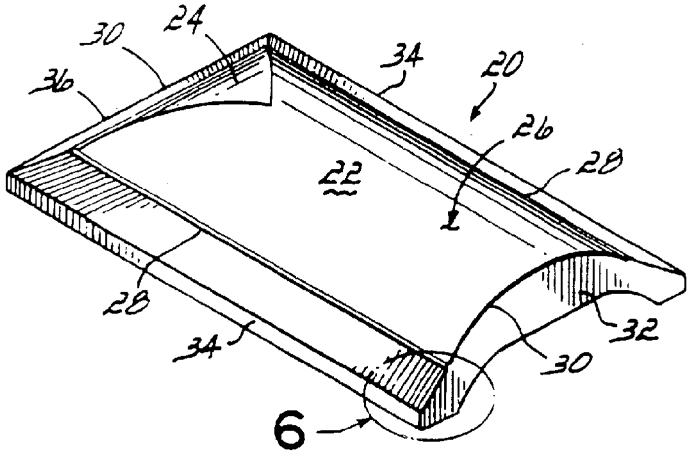
FIG. 4 is a perspective view of a casket lid including crown, pie, rim and header formed with the tooling of FIGS. 1–3.

Referring to FIG. 4, a lid 20 produced by the method of the present invention is illustrated. The lid 20 includes a crown 22 and a pie 24 at one end of the crown 22. The crown 22 and pie 24 together comprise a cover 26 having a pair of opposed sides 28 and a pair of opposed ends 30. A header 32 is positioned at the end 30 opposite from the pie 24. A side rim member 34 is positioned at each side 28 of the cover 22 and an end rim member 36 is positioned at the end 30 of the cover 22 corresponding to the pie 24.

Referring back to FIG. 1, to form such a casket lid 20 with the tooling 10, settable material 40 is first shaken onto the male portion 12 of the tooling 10 with a shaker (not shown) positioned between the male 12 and female 14 portions of the tooling 10. In general the amount of material 40 applied to the tooling 12 is on the order of about 3.5 times the thickness of the finished casket lid at a particular location on the tooling 12. The settable material 40 is comprised of shredded and dried wood chips and a binder. Other fibrous material other than wood chips may be utilized however, such as cane fibers, glass fibers, cottonized or asbestos fibers, etc. The binder is preferably a thermosetting binding material or thermosetting plastic such as melamine, urea formaldehyde or phenolformaldehydrate.

Figure 2:
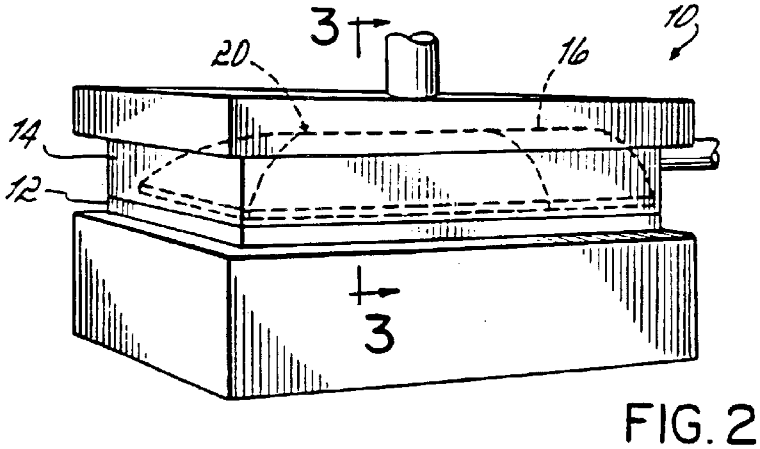
FIG. 2 is a view similar to FIG. 1 except that the male and female portions of the tooling are illustrated in the closed molding position.

After the exterior surface of the male portion 12 of the tooling 10 is covered with the settable material 40, and referring now to FIG. 2, the female portions of the tooling 14, 16 compress the material 40 onto the tooling 12 so as to mold the material 40 into the desired shape. As used herein, the terms "mold" and "molding" shall embrace the method herein described and illustrated, and equivalents thereof, but shall exclude the process of applying fiberglass and resin to a form known as "laying up". The pressure applied by the tooling 10 on the material 40 is on the order of about 450 tons. The tooling portions 12, 14 and 16 are heated with superheated water flowing therethrough (not shown) such that the tooling 10 is heated to about 165° C. The initial heating and pressing of the material 40 is maintained for about 3 minutes. Shims (not shown) are interposed between the tooling portions 12, 14 and 16 during this initial pressing and heating step and serve as spacers so that the tooling will not overly compress the thickness of the lid 20.

Figure 7:
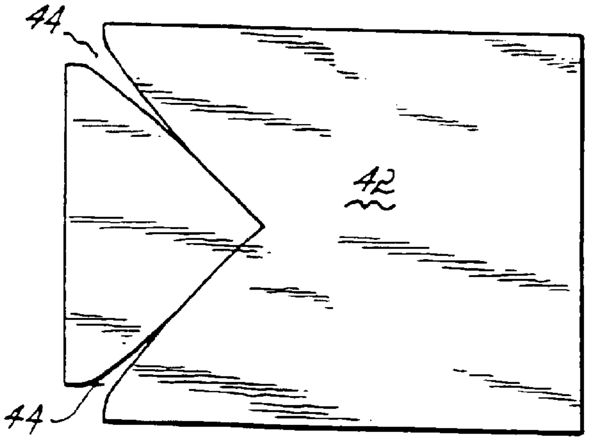
FIG. 7 is a top plan view illustrating the resin impregnated tissue paper with miter cutouts for application to the settable material as per FIG. 1.

After the initial heating and pressing step the tooling 10 is opened and resin impregnated tissue paper 42 is applied onto the settable material 40 (FIG. 1). The paper 42 is preferably 80 gram recycled paper impregnated with 100% melamine. One commercial source for paper of this type is Casco Impregnated Papers, Inc. of Cobourg, Ontario, Canada. As shown in FIG. 7, the paper 42 may include miter cutouts 44 to aid the paper 42 in forming to the material 40 in the area of the pie 24 of the lid 20 to avoid bunching and the like. The female portions 14, 16 of the tooling 10 are then moved back into engagement with the material 40 (this time with the shims removed) to again compress and heat the settable material 40 to further form the lid 20. This subsequent heating and pressing step is performed for about 3 minutes.

Figure 8:
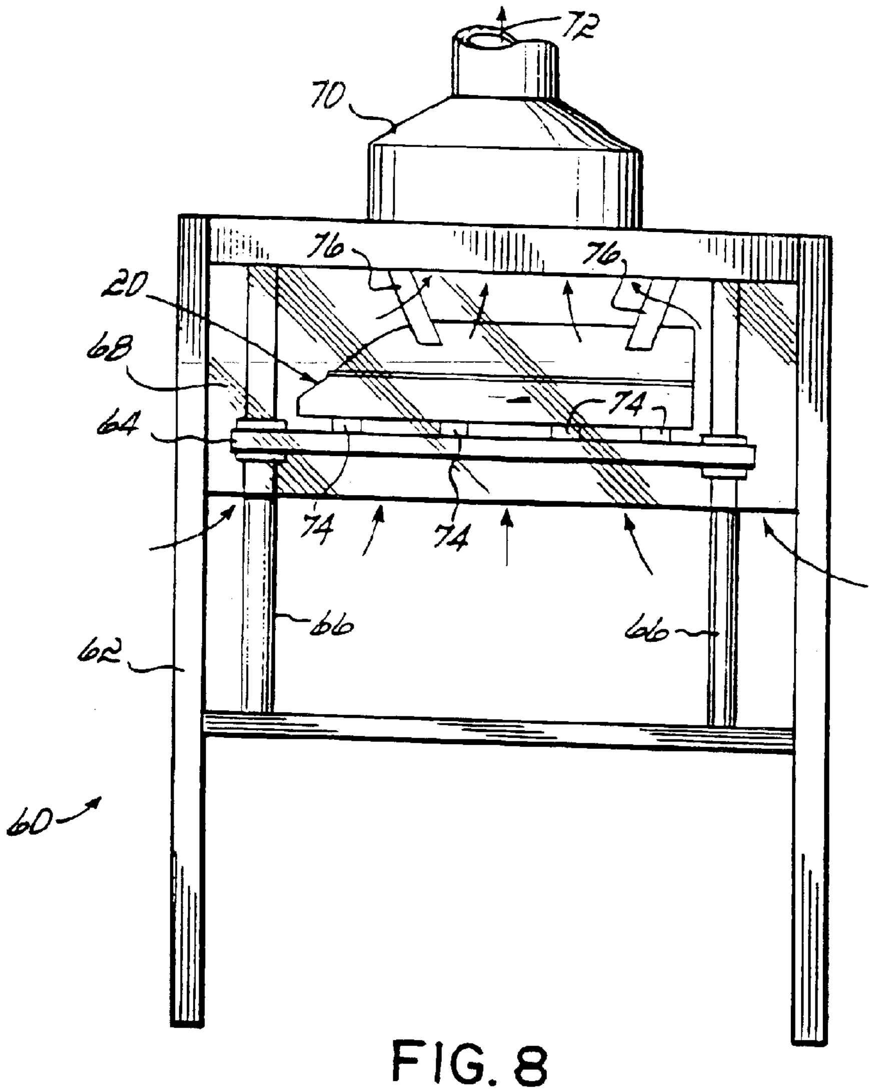
FIG. 8 is a side elevational view of a formed casket lid cooling on a cooling rack.
Figure 9:
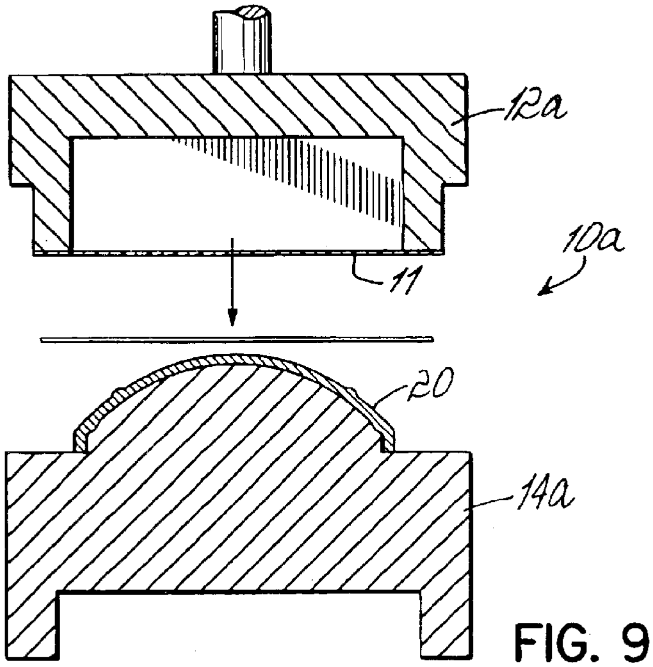
FIG. 9 is a perspective view of a membrane press for pressing a wood veneer sheet onto a molded casket lid, with the press illustrated in the open position.
Figure 10:
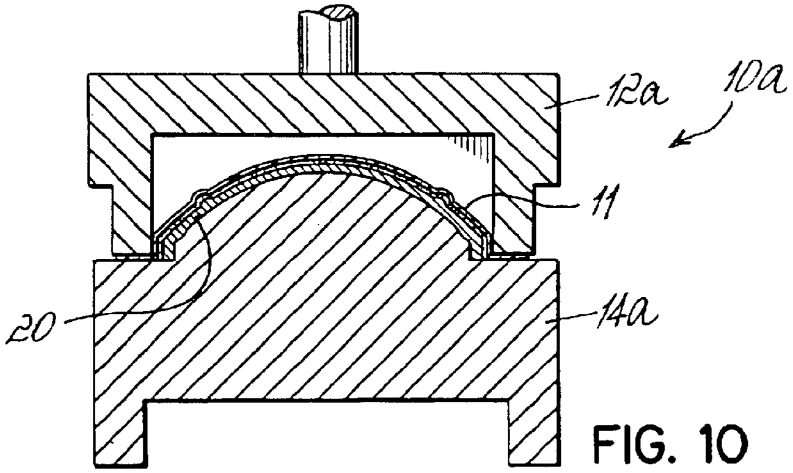
FIG. 10 is a view similar to FIG. 9 except that the press is illustrated in the closed pressing position.

At the completion of this second heating and pressing step the lid 20 is removed from the tooling 10 and permitted to cool. A cooling stand 60 such as that shown in FIG. 8 may be employed to cool the lid 20. The stand 60 includes a frame 62 including a lid supporting platform 64. Hydraulic or pneumatic cylinders 66 move the platform to a lower position to permit placement of the lid 20 on the platform 64 and to an upper position within a transparent enclosure 68. A fan housing 70 houses a fan (not shown) which pulls ambient air upwardly into the enclosure 68 and around lid 20. The air exhausts at 72. Contoured internal supports 74 support the lid 20. Contoured external supports 76 clamp the lid 20 against the internal supports 74 when the platform 64 is in the upper position, to prevent the lid 20 from warping during cooling.

Figure 3:
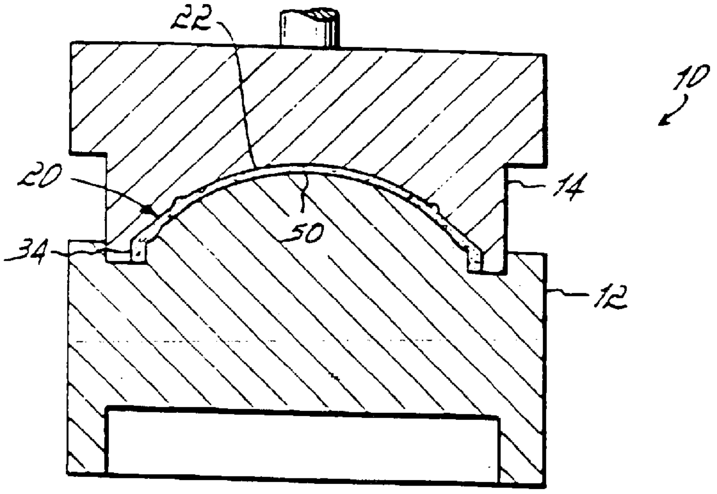
FIG. 3 is a view taken along line 3—3 of FIG. 2.

The underneath side 50 of the female portion 14 of the tooling 10 (FIGS. 1 and 3) preferably includes a pattern formed therein which, when the settable material 40 is pressed thereby, transmits the pattern into the settable material 40. The pattern preferably simulates wood grain.

Figure 5A:
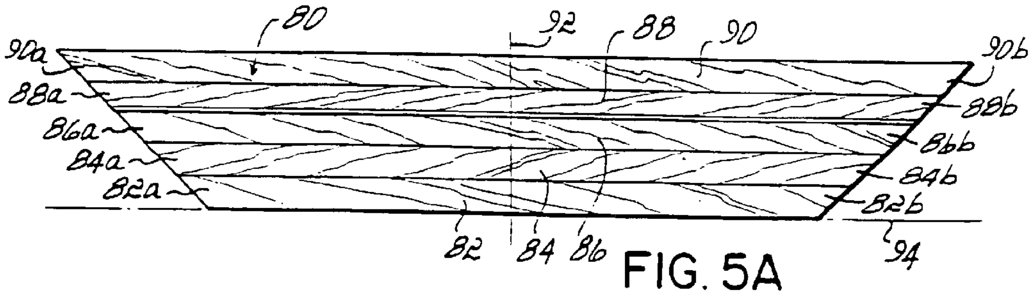
FIGS. 5A–5C illustrate the pattern formed in the casket lid of FIG. 4 by the tooling such that two such lids installed onto a casket shell have the appearance of being constructed from full length boards.
Figure 5B:
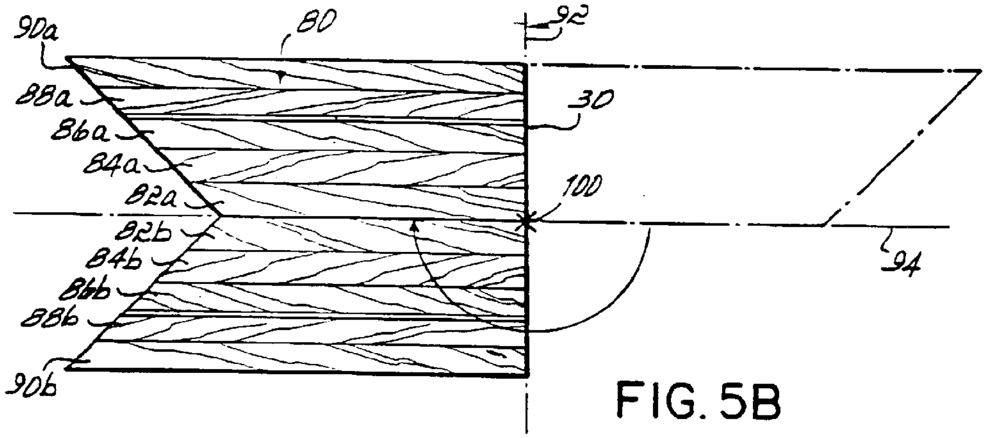
Figure 5C:
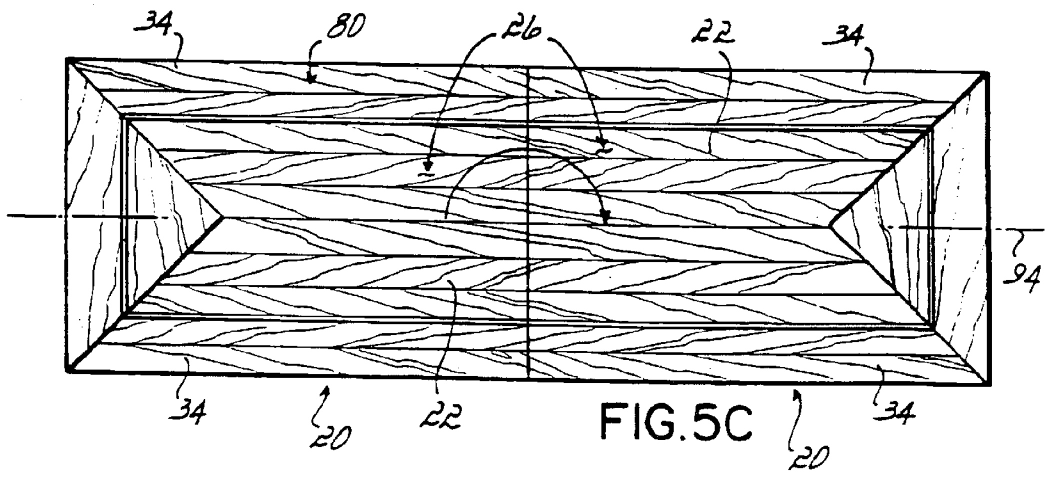

Referring to FIGS. 5A–5C, the wood grain pattern 80 formed in the underside 50 of the female portion 14 of the tooling 10 and applied to the lid 20 is illustrated. Referring first to FIG. 5A, the wood grain pattern from a plurality of "full length," i.e. the length of the head and foot end cap crowns combined, boards 82, 84 and 86 is illustrated, as are full length rim boards 88 and 90. Line 92 represents the mid-point along the boards 82, 84, 86, 88 and 90. Line 94 represents the longitudinal axis of symmetry of the lid(s) 20. It is desirable for the wood grain pattern of the lids 20 abutted header end-to-header end to be continuous, as this gives the visual impression that so-called full length boards have been used to construct the lids.

By rotating the wood grain pattern on the right hand side of the line 92 and above the line 94 clockwise 180° about an axis 100 which is perpendicular to the plane defined by the lid 20, which is located medially of the transverse extent of the lid 20 (i.e. is centered widthwise) and which is coincident with the header end edge 30 of the lid 20, the wood grain pattern illustrated in FIG. 5B is produced. In essence, the portions 82*b*, 84*b*, 86*b*, 88*b* and 90*b* of the boards 82, 84, 86, 88 and 90 are rotated clockwise around and towards the portions 82*a*, 84*a*, 86*a*, 88*a* and 90*a* such that the portions 82*b*, 84*b*, 86*b*, 88*b* and 90*b* are positioned on the left hand side of the line 92 and below the line 94. Thus, board portions 82*a*, 84*a*, 86*a*, 88*a* and 90*a* are positioned on one side of the longitudinal axis of symmetry 94, whereas board portions 82*b*, 84*b*, 86*b*, 88*b* and 90*b* are positioned on the other side of longitudinal axis of symmetry 94.

Making two lids 20 with the tooling 10 thus produces two lids having the identical wood grain pattern 80 of FIG. 5B. Rotating the second such lid clockwise 180° (FIG. 5C) such that two such lids 20 are positioned header end-to-header end, i.e. as when positioned together atop a casket shell, produces a simulated wood grain pattern of the covers 26 and side rims 34 that matches and is continuous end-to-end thereby creating the visual impression that the crowns 22 and side rims 34 of the casket caps are fabricated of so-called "full length" boards, a feature which is more visually and aesthetically appealing than constructing the head and foot end caps of a casket out of non-full length boards.

Figure 6:
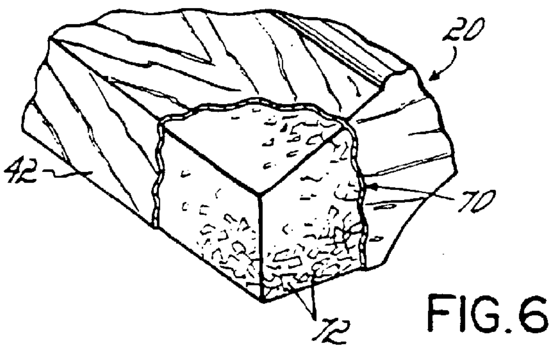
FIG. 6 is the encircled are 6 of FIG. 4, enlarged, with the resin impregnated tissue paper partially broken away.

Referring now to FIG. 6, the resin-impregnated tissue paper 42 is shown cut away at 70. As can be seen from the Figure, the paper 40 conceals the wood chips 72 in the wood chip and binder mixture 40. The paper 42 may be stained as desired to complete the wood finish look of the lid 20.

The invention thus provides a one-piece, unitary lid for a casket which includes a crown, a pie, a rim and header: separate fabrication and assembly of individual components are thus eliminated. The lid includes a decorative wood grain pattern applied thereto. The paper covering forming an outer skin of the lid conceals the wood chips in the material from which the lid is formed and may be attractively stained to further enhance the wood look. And, when two lids are placed end-to-end atop a casket shell the wood grain is continuous from the head end to the foot end of the lids thus presenting the appearance of lids fabricated from so-called full length boards.

The invention may also be practiced in conjunction with the application of wood veneer to the surface of the molded lid 20. The veneer can be applied to either the entire lid 20 all at once (whether for a full length cap or for a split cap), or to portions of the lid 20 in a series of steps. In addition, a combination of wood veneer applied to selected portions of the molded lid 20, in combination with either solid wood lid portions or wood veneered solid non-wood (fiberglass, plastic, etc.) lid portions, can be used to fabricate the lid 20. In addition, the wood veneer can be applied to other portions of a casket other than just the lid, for example the casket shell side walls, end walls, top mold, base mold, etc. In those cases, the underlying structure to which the veneer is applied can either be a molded product molded by the steps above, or other material such as medium density fiberboard, timber core (also known as oriented strand board), particle board, fiberglass, or plastic, for example. While the step of applying the veneer will be described below in the context of utilizing either a membrane press or a profile wrapping machine, it is to be appreciated that the veneer could be applied to the underlying substrate by other techniques and still be within the spirit and scope of the invention.

In a presently preferred method of practicing the invention in conjunction with wood veneer, and referring now to FIGS. 9–12H, a lid 20 comprising cover 26 (cover 26 being comprised of pie 24 and crown 22), header 32, side rim members 34 and end rim member 36 is first molded by the technique above. Approximately ⅛ inch thick strips of wood veneer 34*a*, 36*a* are then secured to the bottom edges of the side and end rim members 34, 36 respectively with glue and/or fasteners. Next an approximately 0.025 inch thick sheet of wood veneer 32*a* is applied to the exterior surface of the header 32 with glue, and a 0.025 inch thick strip of wood veneer 32*b* is applied to the bottom edge of the header 32 with glue.

The pie 24 and end rim 36 of the lid 20 are then veneered. A precut (e.g. with a laser cutting device) sheet of approximately 0.025 inch thick wood veneer 24*a* has glue applied to it (e.g. with a stationary glue wheel over which the sheet of wood veneer 24*a* is run). The glue is preferably a cross-linking PVA such as that marketed by Franklin Adhesives as Multibond MX90. The sheet of wood veneer 24*a* is then placed on the pie 24 and end rim 36 of the lid 20. The lid 20 with wood veneer 24*a* applied to the pie 24 and end rim 36 thereof is then placed in a "membrane press" 10*a*, a press which utilizes a silicone rubber membrane 11 to conform the veneer to the profile of the lid 20, and heat and pressure are applied to one side of the lid 20 by one side 12*a* of the press 10*a*, while a vacuum can be (though is not necessarily) applied to the other side of the lid 20 by the other side 14*a* of the press 10*a*. The lid 20 is then removed from the press 10*a*, and the excess wood veneer is trimmed from the end rim edge and miters of the pie veneer 24*a*. The process is then repeated with crown veneer 22*a* for the crown 22 and side rim members 34.

In order for the miter where the pie veneer 24*a* and crown veneer 22*a* meet to have the proper aesthetics, the following procedure is employed. Prior to applying the glue laden veneer 24*a* to the pie 24 and end rim 36, tape 100 is applied to the bare lid 20 along the miters where the pie 24 intersects the crown 22. The tape 100 is preferably a high temperature masking tape such as that marketed by 3M as either 4737T or 2364. The tape 100 is then trimmed precisely by an automated trimming machine 104 along its respective miter, and the tape portion 100*a* on the pie 24 side of the miter is pulled up and removed, leaving just the tape portion 100*b* on the crown 22 side. The precut veneer 24*a* to be applied to the pie 24 and end rim 36 is sized so as to overhang the miters and end rim slightly. The glue laden pie veneer 24*a* is then applied to the pie 24 and end rim 36, and the cover 26 is placed into the membrane press 10*a* for about 30 to 120 seconds at a press temperature of about 340 degrees F. (which produces a glue temperature of about 180 to 210 degrees F.) and a press pressure of about 60 psi, and is then removed. Next a second piece of tape 102 is applied to the pie veneer 24*a* and to the bare crown 22 along the miters. The excess pie veneer 24*a*' is trimmed precisely by the trimming machine 104 along the miters. The excess veneer overhanging the bottom edge of the end rim 36 is also trimmed away, and can be done so manually. The tape portion 100*b* on the crown 22 side of the miter lines is then pulled up and removed, removing with it the excess pie veneer 24*a*' as well as tape portion 102*b*, leaving just tape portion 102*a* on the pie 24 side of the miter lines and overlying the pie veneer 24*a*.

The precut veneer 22*a* to be applied to the crown 22 is also sized so as to overhang the miters and side rims 34 slightly. The glue laden crown veneer 22*a* is then applied to the crown 22 and the cover 26 is again placed in the membrane press 10*a* at the pressure and temperature, and for the duration, mentioned above. The cover 26 is then removed from the membrane press 10*a* and the excess crown veneer 22*a*' is trimmed precisely by the trimming machine 104 along the miters. The excess veneer overhanging the bottom edges of the side rims 34 and header 32 is also trimmed away, and can be done so manually. The tape portion 102*a* remaining on the pie 24 side of the miter lines and overlying the pie veneer 24*a* is then pulled up and removed, removing with it the ecess crown veneer 22*a*'.

Figure 13:
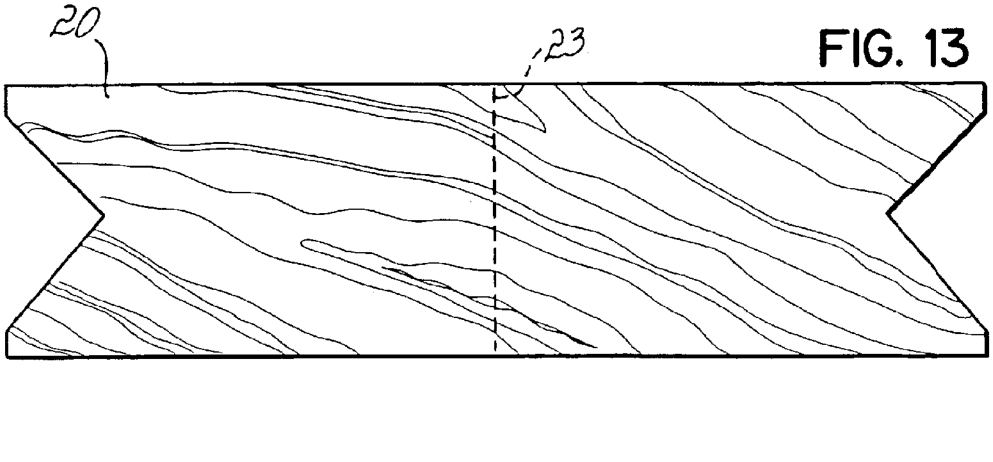
FIG. 13 is a top plan view of a double length sheet of veneer to be applied simultaneously to 2 split top caps.
Figure 11:
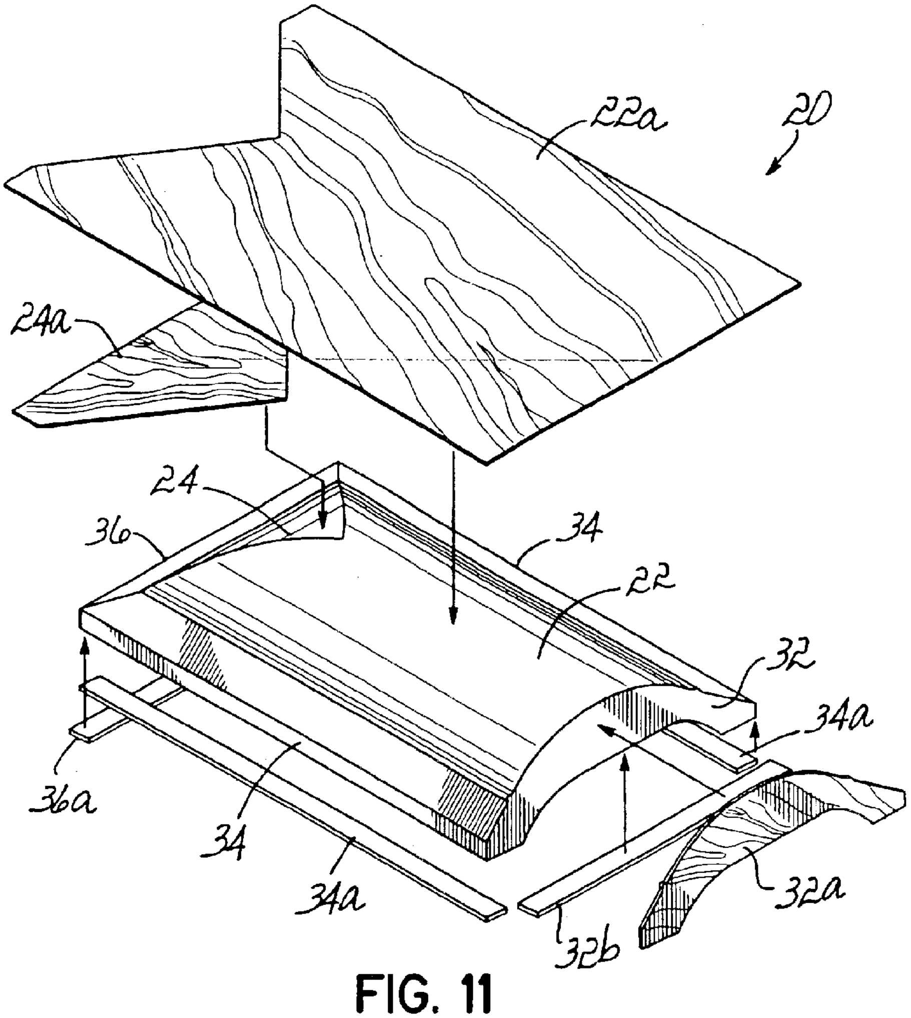
FIG. 11 is a perspective view of a molded lid, a pie sheet of veneer and a crown sheet of veneer, prior to assembly.
Figure 12A:
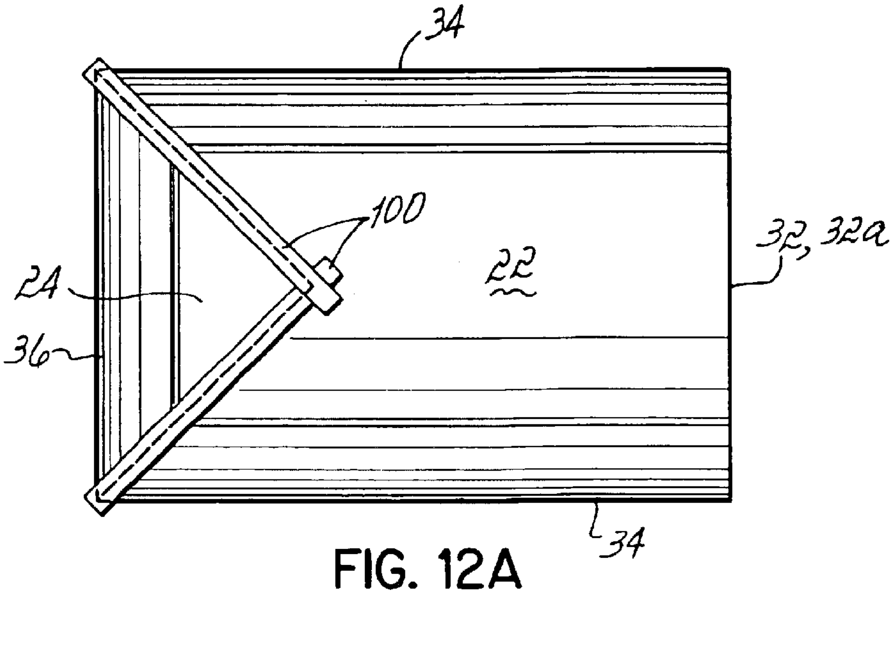
FIGS. 12A–12H are top plan views of the lid, pie veneer and crown veneer during the steps of forming the miter between the pie veneer and the crown veneer.
Figure 12B:
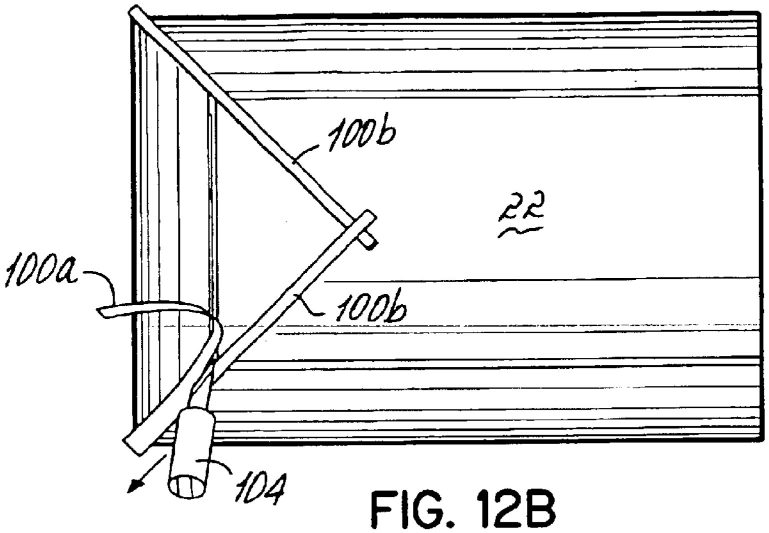
Figure 12C:
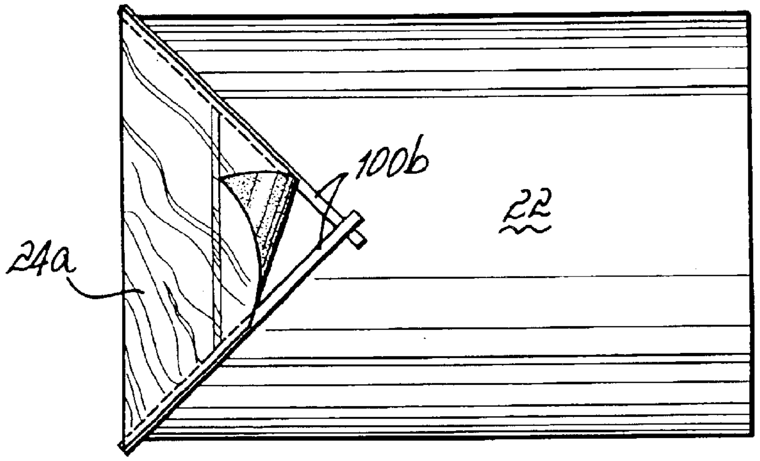
Figure 12D:
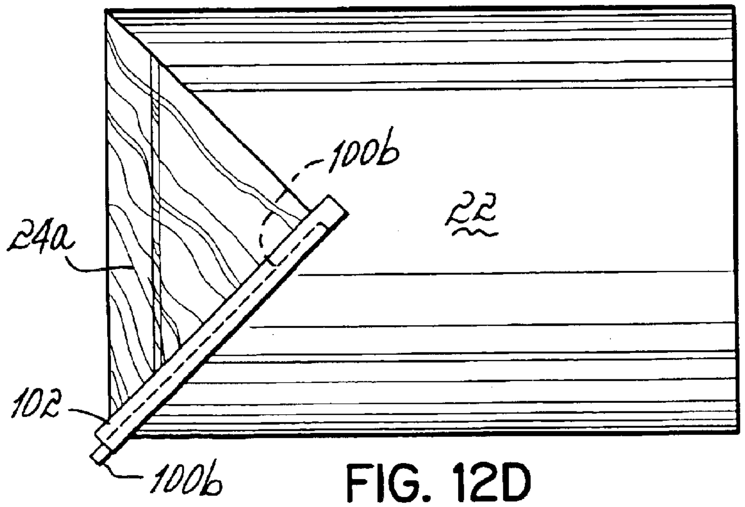
Figure 12E:
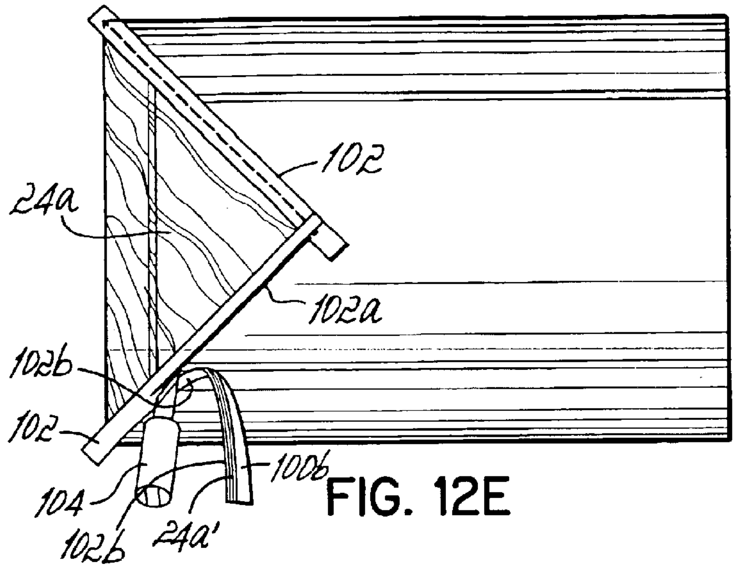
Figure 12F:
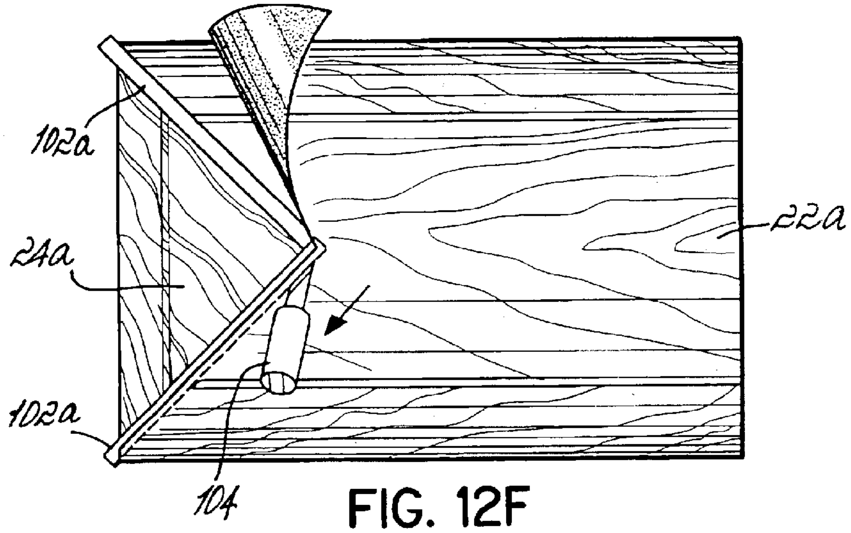
Figure 12G:
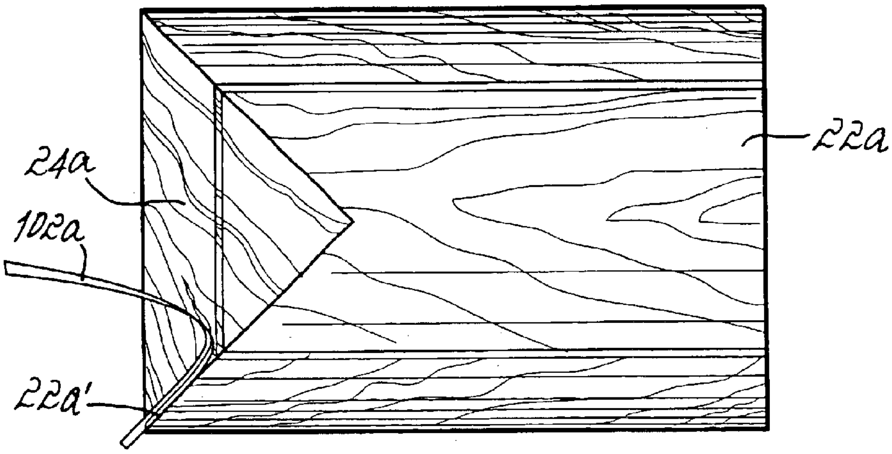
Figure 12H:
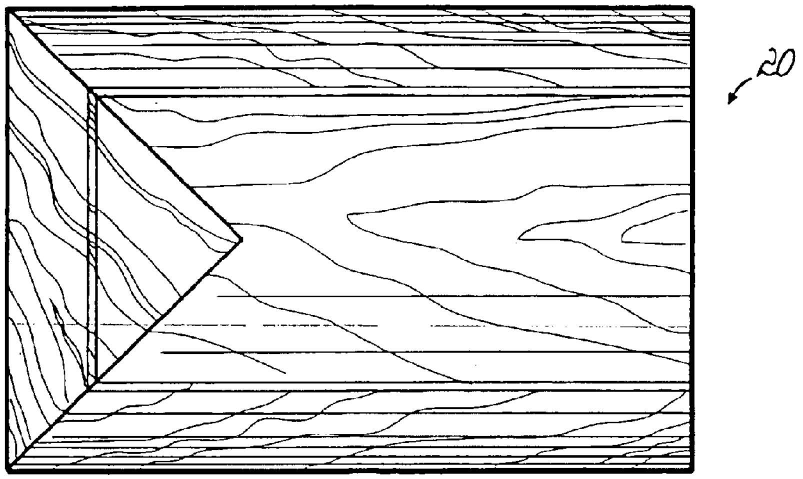

In the production of split caps or lids, it is particularly advantageous to perform the pressing step with 2 lids 20 oriented header-to-header and spaced slightly apart, in the press 10*a*. In that case a sheet of crown veneer 22*a* long enough to cover both crowns 22 of both lids 20 is used. During the laser cutting step of cutting out such a length of crown veneer 22*a*, perforations 23 are formed in the crown veneer 22*a* at its mid-length point; during the pressing step the membrane press 10*a* tears the veneer sheet along the perforations. See FIG. 13. Installing a pair of lids 20 produced in this manner on a casket shell creates a visually aesthetically appealing matching, continuous grain pattern where the head end and foot end cap crowns meet.

Finally, a roller is applied to the abutting edges of the pie veneer 24*a* and crown veneer 22*a*, i.e. along the miters, to assist in producing a smooth, even and aesthetically pleasing transition between the two veneer sheets.

Figure 14:
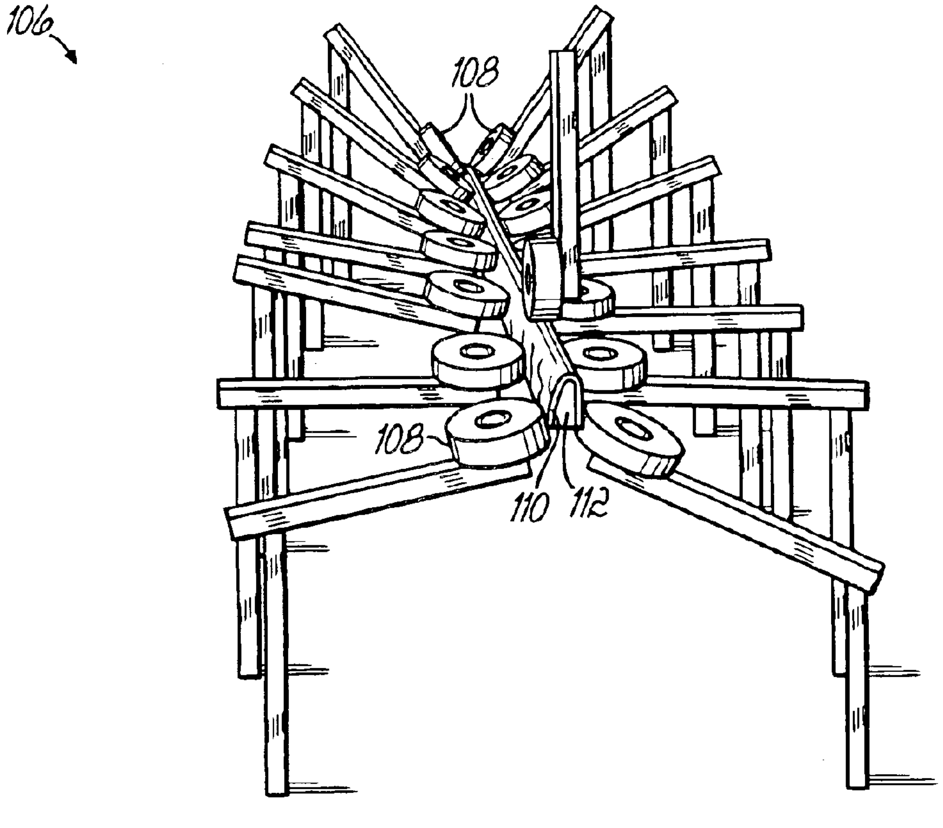
FIG. 14 is a perspective view of a profile wrapping machine for profile wrapping veneer onto selected portions of a casket lid or shell.

An alternative to the membrane press 10*a* for conforming the veneer to the casket lid or to selected portions thereof, or to other portions of the casket, is to use the technique of "profile wrapping." See for example U.S. Pat. Nos. 5,234,519 and 3,541,592, both of which are hereby incorporated by reference herein as if fully set forth in their entirety. As shown in FIG. 14, a profile wrapping machine 106 includes a plurality of rollers 108 positioned to conform or "wrap" a sheet of veneer 110 around an underlying structure 112, which could be for example an entire casket lid or portions thereof, or casket shell top mold or base mold, etc.

Various combinations and permutations of the above can also be practiced. For example, only the cover portion 26 of the lid 20 could be molded by the principles of the invention. Then solid wood side and end rim members 34, 36 could be attached to the cover 26 with glue and/or fasteners. The cover 26 could be veneered as described above either before or after attachment of the rim members 34, 36. Alternatively, the rim members could be fabricated by profile wrapping veneer onto a solid non-wood substrate. Further, the entire lid 20 could be molded as described above, and then the pie 24 and end rim 36 could be cut out of the lid 20. The pie 24 and end rim 36 could be veneered in one step, and the crown 22 and side rims 34 could be veneered in another step; once both are veneered the two could be assembled with glue and/or fasteners. Still further, just the crown 22 and side rims 34 could be molded as described above, and a pie 24 and end rim 36 could be fabricated out of solid wood and attached to the crown 22 and side rims 34 with glue and/or fasteners.

Other variations are as follows. The lid 20 could be pressed with crown veneer 22*a* applied to the crown 22 and side rims 34, and then the veneer 22*a* could be trimmed as described above. Then a perfectly laser cut pie veneer 24*a* could be pressed onto the pie 24 and end rim 36, thus requiring no trimming of the pie veneer 24*a*. Or, the lid 20 could be pressed with pie veneer 24*a* applied to the pie 24 and end rim 36, and then the veneer 24*a* could be trimmed as described above. Then a perfectly laser cut crown veneer 22*a* could pressed onto the crown 22 and side rims 34, thus requiring no trimming of the crown veneer 22*a*. Or, both the pie veneer 24*a* and the crown veneer 22*a* could be perfectly laser cut, and then pressed onto the lid 20, thus requiring no trimming of either.

Figure 15:
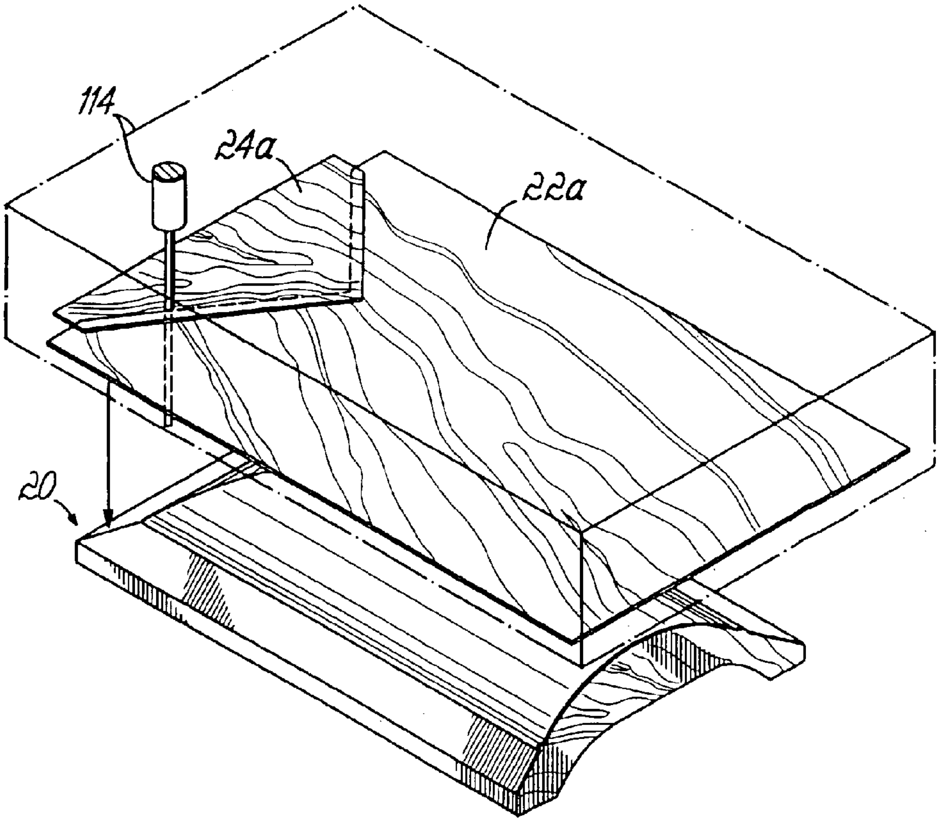
FIG. 15 is a perspective view of a tool for use in "match trimming" the crown veneer and pie veneer simultaneously and pressing the pie veneer into place.

Further, and referring now to FIG. 15, a tool 114 could be fabricated to "match cut" or "match trim" both the pie veneer 24*a* and crown veneer 22*a* at the same time. The tool 114 would be configured to hold the pie veneer 24*a* (such as by a vacuum) in position to be applied to the lid 20 with crown veneer 22*a* already applied (but not trimmed). The tool 114 would include a moving knife 116 which travels around the periphery of the tool 104, trimming the pie veneer 24*a* at the same time as trimming the crown veneer 22*a*. The tool 114 would be configured to remove the trimmed excess of the pie veneer 24*a* and crown veneer 22*a*, and then press the pie veneer 24*a* into place. Thus the tool 114 would be configured to apply temperatures and pressures similar to the membrane press discussed above.

"Marquetry" is a decorative veneer sheet which is assembled from many separate individual pieces/colors/designs of veneer to produce an intricate pattern, and when applied to a substrate resembles an "inlay." Marquetry is especially appropriate as the veneer to apply to the molded lid 20 of this invention as the resulting casket lid gives the appearance of being finely tooled and decoratively inlaid. Other variations on the veneer aspect of the invention can include running the sheet of veneer through an ink jet printer to apply an ink pattern to the veneer, and then applying the veneer sheet to the casket lid. Or, the veneer sheet could be laser engraved with designs and/or text prior to applying it to the casket lid.

Those skilled in the art will readily recognize numerous adaptations and modifications which can be made to the present invention which will result in an improved casket lid and method for making, yet all of which will fall within the spirit and scope of the present invention as defined in the following claims. For example, the method of this invention readily lends itself to fabricating lids for so-called full-couch caskets, i.e. caskets which have a single full-length lid rather than a pair of so-called split caps. In that case, the lid does not have a header on one end. Rather, the lid includes a full-length crown, a pie at each end of the crown, a pair of side rim members one of which is at each side of the crown and a pair of end rim members one of which is at each pie. Further, even though the material to be molded is described and illustrated as being applied to the male tool prior to molding the material, it is to be understood that the material could just as well be applied to the female tool instead, or be applied to both the male and female tools, prior to molding the material. In addition, fibrous materials other than those mentioned above may be utilized in the practice of the present invention; for example, plastic chips may be used. Further, wood veneer can be utilized as a covering for the molded cap. Still further, a thermal transfer layer, i.e. a sheet with ink printed thereon, could be used to place an ink pattern on the molded cap. Still further, a flange, such as an extruded plastic flange, could be attached to the cap for securing a dish assembly in the cap interior. Or alternatively a flange could be molded directly into the cap thus providing an integral means of securing the dish assembly within the cap. Thus, the invention shall embrace all such variations. Accordingly, the invention is to be limited only by the scope of the following claims and their equivalents.

What is claimed is:

1. A method of making a lid for a casket comprising:

providing tooling configured to produce a one-piece, unitary casket lid having a crown, a pie, a rim and a header;

providing settable material from which to mold the lid;

molding the settable material with the tooling;

permitting the settable material to set thereby producing a one-piece, unitary casket lid having a crown, a pie, a rim and a header; and adhesively applying a wood veneer sheet to at least a portion of the lid.

2. The method of claim 1 wherein the veneer sheet is applied to the lid with a membrane press.

3. The method of claim 1 wherein the veneer sheet is applied to the lid with a profile wrapping machine.

4. The method of claim 1 wherein glue is applied to the veneer sheet and the veneer sheet is adhered to the lid with the use of heat and pressure.

5. The method of claim 1 wherein the veneer sheet is applied to the exterior surfaces of the crown, pie, rim and header.

6. A method of making a lid for a casket comprising:

providing tooling configured to produce a one-piece, unitary casket lid portion having a crown and a pie;

providing settable material from which to mold the lid portion;

molding the settable material with the tooling;

permitting the settable material to set thereby producing a one-piece, unitary casket lid portion having a crown and a pie; and adhesively applying wood veneer to the crown and the pie.

7. The method of claim 6 wherein the veneer is applied with a membrane press.

8. The method of claim 6 wherein the veneer is applied with a profile wrapping machine.

9. The method of claim 6 wherein glue is applied to the veneer and the veneer is adhered to the lid portion with the use of heat and pressure.

10. The method of claim 6 wherein a rim is fabricated of solid wood and is attached to the crown and pie.

11. The method of claim 6 wherein a rim is fabricated from a solid non-wood substrate profile wrapped with wood veneer, and is attached to the crown and pie.

12. A method of making a lid for a casket comprising:

providing tooling configured to produce a one-piece, unitary casket lid portion having a crown and a pair of side rims;

providing settable material from which to mold the lid portion;

molding the settable material with the tooling;

permitting the settable material to set thereby producing a one-piece, unitary casket lid portion having a crown and a pair of side rims; and adhesively applying wood veneer to the crown and side rims.

13. The method of claim 12 wherein the veneer is applied with a membrane press.

14. The method of claim 12 wherein the veneer is applied with a profile wrapping machine.

15. The method of claim 12 wherein glue is applied to the veneer and the veneer is adhered to the crown and side rims with the use of heat and pressure.

16. The method of claim 12 wherein a pie and end rim is fabricated of solid wood and is attached to the crown and side rims.

17. A method of making a lid for a casket comprising:

providing tooling configured to produce a one-piece, unitary casket lid having a crown, a pie, a pair of side rims, an end rim and a header;

providing settable material from which to mold the lid;

molding the settable material with the tooling;

permitting the settable material to set thereby producing a one-piece, unitary casket lid having a crown, a pie, a pair of side rims, an end rim and a header;

separating the pie and end rim from the crown and the side rims;

adhesively applying a first wood veneer sheet to the pie and end rim;

adhesively applying a second wood veneer sheet to the crown and side rims; and attaching the veneered pie and end rim to the veneered crown and side rims.

18. The method of claim 17 wherein the veneer sheets are applied with a membrane press.

19. The method of claim 17 wherein the veneer sheets are applied with a profile wrapping machine.

20. The method of claim 17 wherein glue is applied to the veneer sheets and the veneer sheets are adhered with the use of heat and pressure.

21. For a casket lid having a pie and a crown, a method of forming a miter joint from first and second sheets of veneer applied to the pie and crown, along a line of intersection of the pie and crown, comprising:

applying a first strip of masking tape to the line of intersection;

trimming the first strip of masking tape along the line of intersection and removing the trimmed portion from the pie side of the line of intersection;

applying a first sheet of veneer to the pie, the sheet overlying the portion of the first strip of masking tape remaining on the crown side of the line of intersection;

applying a second strip of masking tape to the first sheet of veneer over the line of intersection;

trimming the second strip of masking tape and the first sheet of veneer along the line of intersection and removing the trimmed portions from the crown side of the line of intersection by removing the portion of the first strip of masking tape remaining on the crown side of the line of intersection;

applying a second sheet of veneer on the crown, the sheet overlying the portion of the second strip of masking tape remaining on the pie side of the line of intersection; and trimming the second sheet of veneer along the line of intersection and removing the trimmed portion from the pie side of the line of intersection by removing the portion of the second strip of masking tape remaining on the pie side of the line of intersection.

22. The method of claim 21 wherein the casket lid is made by a method comprising:

providing tooling configured to produce a one-piece, unitary casket lid portion having a crown and a pie;

providing settable material from which to mold the lid portion;

molding the settable material with the tooling; and permitting the settable material to set thereby producing a one-piece, unitary casket lid portion having a crown and a pie.

23. The method of claim 21 wherein the casket lid is made by a method comprising:

providing tooling configured to produce a one-piece, unitary casket lid having a crown, a pie, a rim and a header;

providing settable material from which to mold the lid;

molding the settable material with the tooling; and permitting the settable material to set thereby producing a one-piece, unitary casket lid having a crown, a pie, a rim and a header.

24. The method of claim 21 wherein the veneer sheets are applied to the lid with a membrane press.

25. The method of claim 21 wherein the veneer sheets are applied to the lid with a profile wrapping machine.

26. The method of claim 21 wherein glue is applied to the veneer sheets and the veneer sheets are adhered to the lid with the use of heat and pressure.

27. The method of claim 21 wherein a rim is fabricated of solid wood and is attached to the crown and pie.

28. The method of claim 21 wherein a rim is fabricated from a solid non-wood substrate profile wrapped with wood veneer, and is attached to the crown and pie.

29. A method of making a head end lid and a foot end lid for a casket comprising:

providing tooling configured to produce a one-piece, unitary casket lid having a crown, a pie, a rim and a header;

providing settable material from which to mold the lid;

molding the settable material with the tooling;

permitting the settable material to set thereby producing a first one-piece, unitary casket lid having a crown, a pie, a rim and a header;

repeating the above steps to produce a second such casket lid;

positioning the first and second lids header-end-to-header end;

adhesively applying a single wood veneer sheet to the crowns of both the first and second lids; and separating the first lid from the second lid.

30. The method of claim 29 wherein the veneer sheet is applied to the lids with a membrane press.

31. The method of any of claims 1, 6, 12, 17, 21 and 29 wherein the veneer is marquetry.

32. The method of any of claims 1, 6, 12, 17, 21 and 29 wherein the veneer has an ink pattern applied thereto.

33. The method of any of claims 1, 6, 12, 17, 21 and 29 wherein the veneer is laser engraved.

34. The method of claim 12 wherein a pie and end rim is fabricated of solid non-wood substrate profile wrapped with wood veneer, and is attached to the crown and side rims.

35. For a casket lid having a pie and a crown a method of forming a miter joint from first and second sheets of veneer applied to the pie and crown, along a line of intersection of the pie and crown, comprising:

applying a first layer of masking material to the line of intersection, trimming the first layer of masking material along the line of intersection and removing the trimmed portion from the pie side of the line of intersection;

applying a first sheet of veneer to the pie, the sheet overlying the portion of the first layer of masking material remaining on the crown side of the line of intersection;

applying a second layer of masking material to the first sheet of veneer over the line of intersection;

trimming the second layer of masking material and the first sheet of veneer along the line of intersection and removing the trimmed portions from the crown side of the line of intersection by removing the portion of the first layer of masking material remaining on the crown side of the line of intersection;

applying a second sheet of veneer on the crown, the sheet overlying the portion of the second layer of masking material remaining on the pie side of the line of intersection; and trimming the second sheet of veneer along the line of intersection and removing the trimmed portion from the pie side of the line of intersection by removing the portion of the second layer of masking material remaining on the pie side of the line of intersection.

36. The method of claim 35 wherein the casket lid is made by a method comprising:

providing tooling configured to produce a one-piece, unitary casket lid portion having a crown and a pie;

providing settable material from which to mold the lid portion;

molding the settable material with the tooling; and permitting the settable material to set thereby producing a one-piece, unitary casket lid portion having a crown and a pie.

37. The method of claim 35 wherein the casket lid is made by a method comprising:

providing tooling configured to produce a one-piece, unitary casket lid having a crown, a pie, a rim and a header;

providing settable material from which to mold the lid;

molding the settable material with the tooling; and permitting the settable material to set thereby producing a one-piece, unitary casket lid having a crown, a pie, a rim and a header.

38. The method of claim 37 wherein the veneer sheets are applied to the lid with a membrane press.

39. The method of claim 37 wherein the veneer sheets are applied to the lid with a profile wrapping machine.

40. The method of claim 37 wherein glue is applied to the veneer sheets and the veneer sheets are adhered to the lid with the use of heat and pressure.

41. The method of claim 37 wherein a rim is fabricated of solid wood and is attached to the crown and pie.

42. The method of claim 37 wherein a rim is fabricated from a solid non-wood substrate profile wrapped with wood veneer, and is attached to the crown and pie.

43. The method of claim 37 wherein the wood veneer is marquetry.

44. The method of claim 37 wherein the wood veneer has an ink pattern applied thereto.

45. The method of claim 37 wherein the wood veneer is laser engraved.

46. The method of claim 30 wherein the veneer sheet is applied with a profile wrapping machine.

47. The method of claim 30 wherein glue is applied to the veneer sheet and the veneer sheet is adhered to the lid with the use of heat and pressure.

48. For a casket lid having a pie and a crown, a method of forming a miter joint from first and second sheets of veneer applied to the pie and crown, respectively, along a line of intersection of the pie and crown, comprising:

providing a cutting tool;

positioning the first and second sheets of veneer so that each overlaps a portion of the other;

match trimming both sheets of veneer with the cutting tool at the same time thereby producing match trimmed edges of the sheets of veneer; and applying the sheets of veneer to the pie and crown of the casket lid, including applying the match trimmed edges of the sheets of veneer in abutting fashion to the pie and crown of the casket lid, to thereby form a miter joint.

49. The method of claim 48 wherein the veneer sheets are applied with a membrane press.

50. The method of claim 48 wherein the veneer sheets are applied with a profile wrapping machine.

51. The method of claim 48 wherein glue is applied to the veneer sheets and the veneer sheets are adhered with the use of heat and pressure.

52. The method of claim 48 wherein the wood veneer is marquetry.

53. The method of claim 48 wherein the wood veneer has an ink pattern applied thereto.

54. The method of claim 48 wherein the wood veneer is laser engraved

55. The method of claim 48 wherein one of the first and second sheets is applied to the casket lid prior to the match trimming step.

56. The method of claim 55 wherein the second sheet is applied to the crown prior to the match trimming step.

57. A method of making a lid for a casket comprising:

providing tooling configured to produce a one-piece, unitary casket lid portion having a crown and a pie;

providing settable material from which to mold the lid portion;

molding the settable material with the tooling;

permitting the settable material to set thereby producing a one-piece, unitary casket lid portion having a crown and a pie;

applying wood veneer to the crown and the pie; and attaching a rim fabricated of solid wood to the crown and pie.

58. The method of claim 57 wherein the veneer is applied to the lid with a membrane press.

59. The method of claim 57 wherein the veneer is applied to the lid with a profile wrapping machine.

60. The method of claim 57 wherein glue is applied to the veneer and the veneer is adhered to the lid with the use of heat and pressure.

61. The method of claim 57 wherein the wood veneer is marquetry.

62. The method of claim 57 wherein the wood veneer has an ink pattern applied thereto.

63. The method of claim 57 wherein the wood veneer is laser engraved.

64. A method of making a lid for a casket comprising:

providing tooling configured to produce a one-piece, unitary casket lid portion having a crown and a pie;

providing settable material from which to mold the lid portion;

molding the settable material with the tooling;

permitting the settable material to set thereby producing a one-piece, unitary casket lid portion having a crown and a pie;

applying wood veneer to the crown and the pie; and attaching a rim fabricated from a solid non-wood substrate profile wrapped with wood veneer, to the crown and pie.

65. The method of claim 64 wherein the veneer is applied to the lid with a membrane press.

66. The method of claim 64 wherein the veneer is applied to the lid with a profile wrapping machine.

67. The method of claim 64 wherein glue is applied to the veneer and the veneer is adhered to the lid with the use of heat and pressure.

68. The method of claim 64 wherein the wood veneer is marquetry.

69. The method of claim 64 wherein the wood veneer has an ink pattern applied thereto.

70. The method of claim 64 wherein the wood veneer is laser engraved.

* * * * *